United States Patent [19]
Choudhury

[11] Patent Number: 5,549,920
[45] Date of Patent: Aug. 27, 1996

[54] EXTRUSION INACTIVATION OF PROTEASE ENZYME IN FISH AND FISH FOOD PRODUCTS

[75] Inventor: Gour S. Choudhury, Kodiak, Ak.

[73] Assignee: University of Alaska, Fairbanks, Ak.

[21] Appl. No.: 361,824

[22] Filed: Dec. 22, 1994

[51] Int. Cl.$^6$ .............................. A23L 3/317; A23L 1/325; A23P 1/12
[52] U.S. Cl. ............................ 426/516; 426/63; 426/332; 426/518; 426/520; 426/641; 426/643; 426/646; 426/656; 426/661
[58] Field of Search ..................................... 426/516, 518, 426/520, 332, 641, 643, 646, 656, 63, 661

[56] References Cited

U.S. PATENT DOCUMENTS

| | | |
|---|---|---|
| 3,000,789 | 9/1961 | Bertullo et al. . |
| 3,170,794 | 2/1965 | Jeffreys et al. . |
| 3,516,349 | 6/1970 | Bertullo et al. . |
| 3,863,017 | 6/1995 | Yueh ........................................ 426/516 |
| 4,816,278 | 3/1989 | Sasamoto et al. . |

OTHER PUBLICATIONS

Kitagawa, "Extrusion Cooking Using Marine Products as Raw Materials," Journal of Fish Sausage, No. 221, 1989.

Kitagawa et al., "Extrusion Cooking Using Marine Products as Raw Materials, Report 1 Extrusion Cooking Using Sardines," Hokuzuishi Monthly, vol. 44, pp. 151–168, 1987 (Report no. B1935).

Kitagawa et al., "Studies on the Extrusion Cooking of Marine Products, III. Effect of Various Extrusion Conditions of Freeze–Pulverized–Bunasake" (Fall Chum Salmon), Sci. Rep. Hokkaido Fish. Exp. Stn., vol. 32, pp. 19–32 (1989).

Murray et al., "Improved Utilization of Fish Protein—Co–extrusion of Mechanically Deboned Salted Minced Fish," Can. Inst. Sci. Technol. J., vol. 13, No. 3, pp. 125–130, Jul. 1980.

Yu et al., "Production and Acceptability of Testing Fish Crackers ('Keropok') Prepared by the Extrusion Method," J. Fd. Technol. vol. 16, pp. 51–58 (1981).

Kristensen et al., "Extruded Protein–Rich Animal By–Products with Improved Texture," Thermal Processing and Quality of Food, Elsevier Pub. 1984.

Hilmarsdottir et al., "Microbial Stability of a Fermented Intermediate Moisture Fish Product," New Jersey Agricultural Experiment Station Publication No. D–10104–1–84 (1984).

Maga et al., "Coextrusion of Carp (*Cyprinus carpio*) and Rice Flour," Journal of Food Processing and Preservation, vol. 9, pp. 121–128 (1985).

Venugopal, "Feasibility of Incorporation of Partially Deodourised Fish Meat in Exrusion Cooked Products," Journal of Food Science and Technology, vol. 24, pp. 147–148, May/Jun. 1987.

Karmas et al., "Novel Products from Underutilized Fish Using Combined Processing Technology," Journal of Food Science, vol. 52, No. 1, pp. 7–9, 1987.

Noguchi, "Extrusion Cooking of High–Moisture Protein Foods," Extrusion Cooking, AACC, 1989, Chapter 11.

Quaglia et al., "Use of Sardine Mince in Ceral Blends to Obtain Extruded Products," Ital. J. Food Sci. No. 4, pp. 23–28, 1989.

Aoki et al., "Texturization of Surimi Using a Twin Screw Extruder," Nippon Shokuhin Kogyo Gakkaishi, vol. 36, No. 9, pp. 748–753 (1989).

(List continued on next page.)

*Primary Examiner*—Helen Pratt
*Attorney, Agent, or Firm*—Finnegan, Henderson, Farabow, Garrett & Dunner, L.L.P.

[57] ABSTRACT

A method is disclosed which inactivates protease enzyme in fish, such as arrowtooth flounder, having this enzyme in a portion thereof. In the process, the fish are minced and then subsequently mixed with a starchy and/or proteinaceous material to form a mixture which is then subjected to high-temperature, short-time processing in a screw extruder containing a reaction zone. Also disclosed is the resulting food product resulting from this process.

30 Claims, 9 Drawing Sheets

OTHER PUBLICATIONS

Nicklason et al., "Simultaneous Heating, Forming and Extruding of Surimi–Based Products," Journal of Food Engineering, vol. 9, pp. 219–229, 1989.

Kitabatake et al., "Continuous Production of Fish Meat Sol Using a Twin–Screw Extruder," Journal of Food Sciences, vol. 53, No. 2, pp. 344–348, 1988.

Bhattacharya et al., "Effect of Extrusion Process Variables on Micro–Structure of Blends of Minced Fish and Wheat Flour," J. Fd. Sci. Technol., vol. 27, No. 1, pp. 22–28, 1990.

Clayton et al., "Extruder Texturized Foods from Underutilized Fish Tissue," Journal of Acquatic Food Product Technology, vol. 1, pp. 65–89, 1992.

Williams et al., "Extrusion, Extrusion—An in–depth look at a versatile process," Food Engineering International, vol. 2, No. 4, pp. 57–62, 1977.

Van de Velde et al., "Destruction of Microorganisms and Toxins by Extrusion–Cooking," Thermal Processing and Quality of Food (P. Leuthen et al., Eds.) Elsevier Applied Science Publishers, London, pp. 155–161, 1984.

M. A. Rao, "Aseptic Processing of Foods," Design and Production of Food Ingredients, pp. 247–249.

Mustakas et al., "Production and Nutritional Evaluation of Extrusion–Full–Fat Soybean Flour," Journal of the American Oil Chemists' Society, pp. 607–614, Sep., 1964.

Mustakas et al., "Extruder–Processing to Improve Nutritional Quality, Flavor, and Keeping Quality of Full–Fat Soy Flour," Food Technology, vol. 24, pp. 102–108, Nov. 1970.

Lorenz et al., "Nutrient Stability of Full–Fat Soy Flour and Corn–Soy Blends Produced by Low–Cost Extrusion," Cereal Foods World, vol. 25, No. 4, pp. 161–172, Apr. 1980.

Linko et al., "High–Temperature, Short–time Extrusion Cooking," Advanced in Cereal Science and Technology, vol. IV, Pomeranz, Ed., Ameican Association of Cereal Chemists Inc., Publ., St. Paul, Minnesota, 1981.

Lewis, "Physical Properties of Foods and Food Processing Systems," Ellis Horwood Series in Food Science and Technology, Section 10.5, Thermal Processing.

Jansen et al., "Nutritional Evaluation of Blended Foods made with a Low–Cost Extruder Cooker," Journal of Food Science, vol. 43, pp. 912–915, 1978.

Harper, "Extrusion of Foods, vol. I," CRC Press, Inc., Boca Raton, Florida, pp. 2.

Geankoplis, "Transport Processes and Unit Operations," Allyn and Bacon, Inc., Publ., Section 4.8, pp. 249–256.

Lund, "Heat Processing," Principles of Food Science, Part II, Marcel Dekker, Inc., New York, 1976.

Nierle et al., "Veranderungen der Geitreideinhaltsstoffe wahrend der Extrusion mit einem Doppelschneckenextruder," With English translation of Conclusion Section.

"Is Alaska Flatfish Fool's Gold?", Seafood Leader, Nov./Dec. 1989, pp. 156–158.

Tettweiler, Peter, "Snack Foods Worldwide", Food Technology, vol. 45(2), Feb. 1991, pp. 58–62.

"Snack Food Month and New Snacks", Food Technology, Feb. 1991, p. 64.

Lee, C. M. and Toledo, R. T., "Factors Affecting Textural Characteristics of Cooked Comminuted Fish Muscle", Journal of Food Science, vol. 41 (1976), pp. 391–397.

Schwimmer, S., "Influence of Water Activity on Enzyme Reactivity and Stability", Food Technology, May 1980, pp. 65–70; 73–84 82–83.

Troller, J. A. "Influence of Water Activity on Microorganisms in Foods", Food Technology, May 1980, Institute of Food Technologies, pp. 76–82.

Rockland, L. B. and Nishi, S., "Influence of Water Activity on Food Product Quality and Stability", Food Technology, Apr. 1980, Institute of Food Technologies, pp. 42–51.

Greene, D. H. and Babbitt, J. K., "A Research Note: Control of Muscle Softening and Protease—Parasite Interactions in Arrowtooth Flounder *Atheresthes stomias*", Journal of Food Science, vol. 55, No. 2, 1990 pp. 579–580.

Wasson, D. H., et al., "Effects of Additives on Proteolytic and Functional Properties of Arrowtooth Flounder Surimi", Journal of Aquatic Food Product Technology, vol. 1(3/4), 1992, pp. 147–165.

Wasson, D. H., et al., "Characterization of a Heat Stable Protease from Arrowtooth Flounder; *Atheresthes stomias*", Journal of Aquatic Food Product Technology, vol. 1(3/4), 1992, pp. 167–183.

Niki, H., et al., "Peruvian Hake Meat Having a Lack of Kamoboko–Forming Property", Bulletin of the Japanese Society of Scientific Fisheries, vol. 50(11), 1984, pp. 1917–1924.

Niki, H., et al., "Properties of Peruvian Hake Meat and Preparation of Purified Surimi", Bulletin of the Japanese Society of Scientific Fisheries, vol. 50(12), 1984, pp. 2043–2047.

Patashnik, M., et al., "Pacific Whiting, *Merluccius productus*: I. Abnormal Muscle Texture Caused by Myxosporidian–Induced Proteolysis", Marine Fisheries Review, vol. 44(5), May 1982, pp. 1–12.

Erickson, M. C., et al., "Proteolytic Activity in the Sarcoplasmic Fluids of Parasitized Pacific Whiting (*Merluccius productus*) and Unparasitized True Cod (*Gadus macrocephalus*)", Journal of Food Science, vol. 48, 1983, pp. 1315–1319.

Konagaya, Shiro, "Jellification and Protease Activity of Yellowfin Sole Muscle in Association with a Myxosporidian Parasite", Bulletin of the Japanese Scoeity of Scientific Fisheries, vol. 46(8), 1980, pp. 1019–1026.

Kudo, G., et al., "Factors Affecting Cooked Texture Quality of Pacific Whiting, *Merluccius Productus*, Fillets with Particular Emphasis on the Effects of Infection by the Myxosporeans *Kudoa paniformis* and *K. thyrsitis*", Fishery Bulletin, vol. 85, No. 4, 1987, pp. 745–756.

Pedersen, L. D., et al., "Hyperfiltration Technology for the Recovery and Utilization of Protein Materials in Surimi Process Wash Water", National Food Processors Association, Dublin, California, NA 86AA–H–SK140, Jan. 1989, for National Marine Fisheries Services, U.S. Dept. of Commerce NOAA.

Martelli, F. G., Ph.D., "Twin–Screw Extruders: A Basic Understanding", Van Nostrand Reinhold Company, pp. 10–11, 24–25, 38–39, 46–47, 64 and 65.

Schwartzberg, H. G., "Biotechnology and Food Process Engineering", Institute of Food Technologists, Basic Symposium Series, pp. 297–307.

Banks, A., et al., "Freezing Fish", Fundamentals of Food Freezing, Avi Publishing Company, Inc., p. 273.

Regenstein, J. M., et al., "Introduction to Fish Technology", an osprey Book, Van Nostrand Reinhold, pp. 126–131.

Aitken, A., et al., "Fish, handling & Processing, Second Edition", for the Ministry of Agriculture, Fisheries & Food, Torry Research Station, Edinburgh, pp. 98–114.

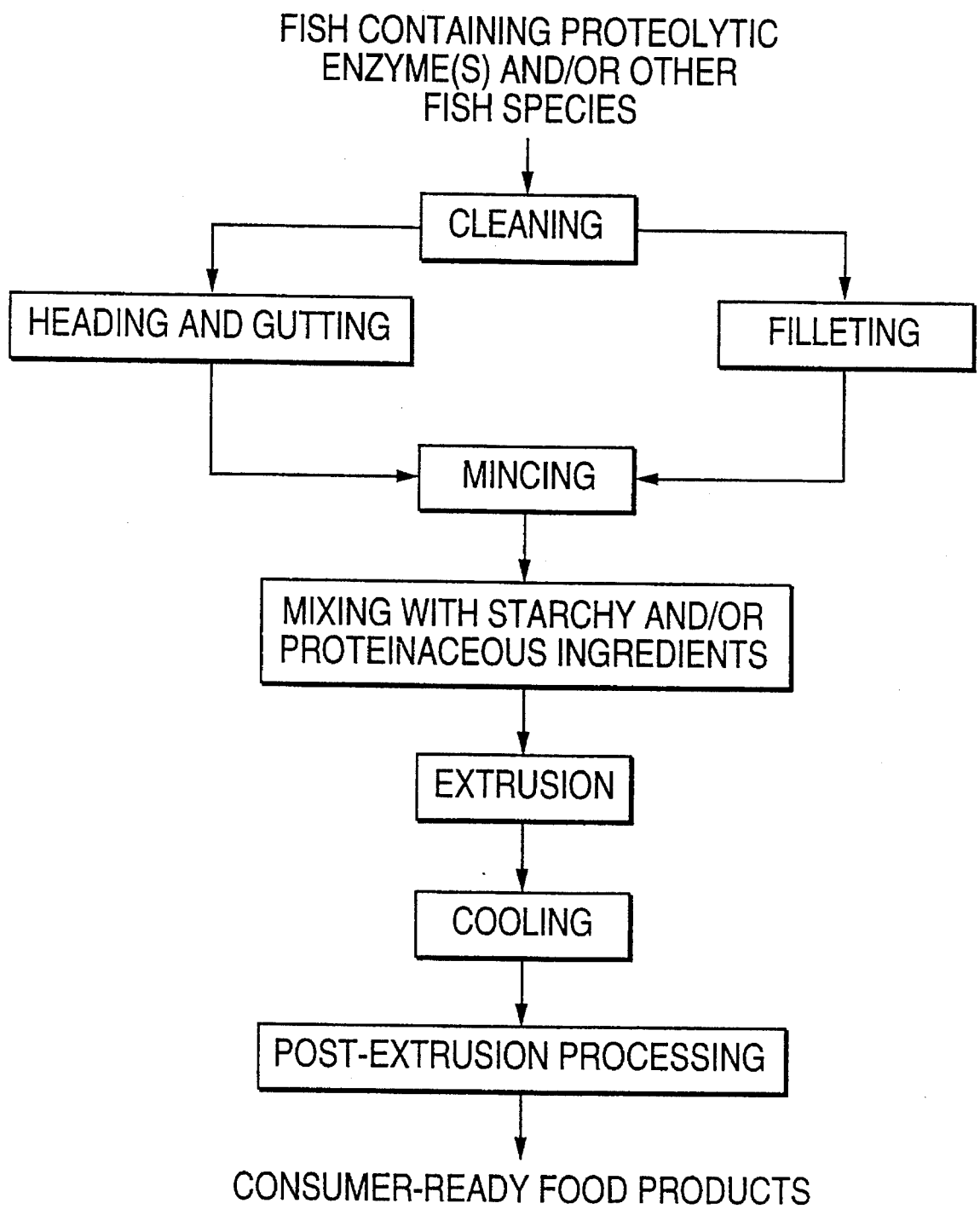

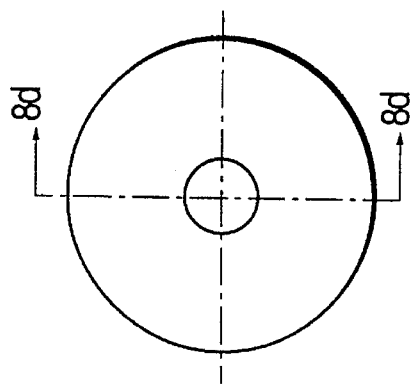
FIG. 8c
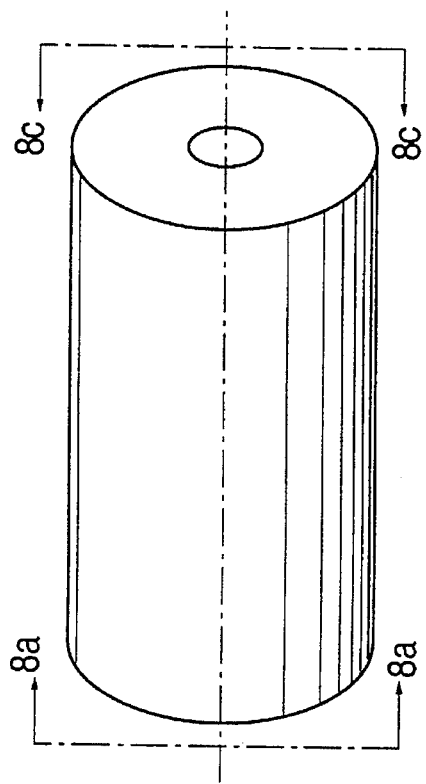
FIG. 8b
FIG. 8a
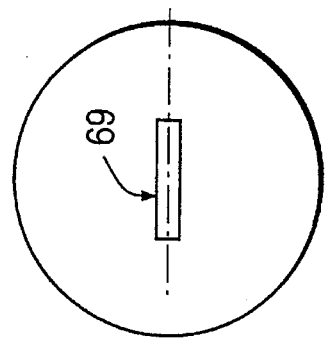
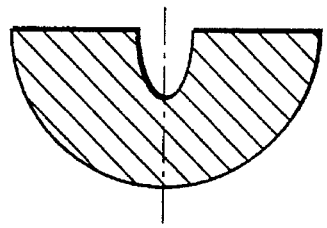
FIG. 8e
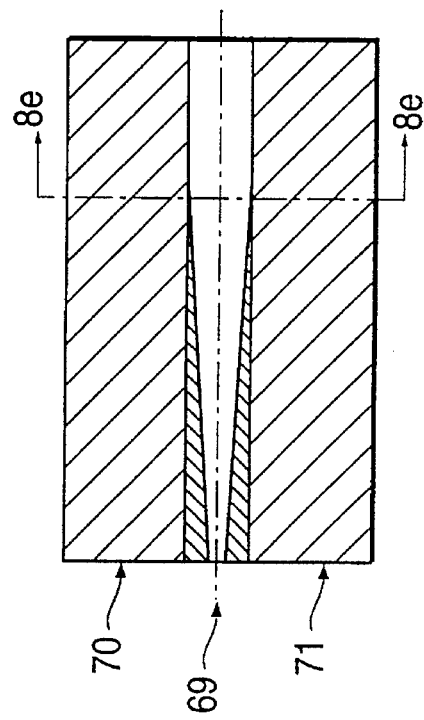
FIG. 8d

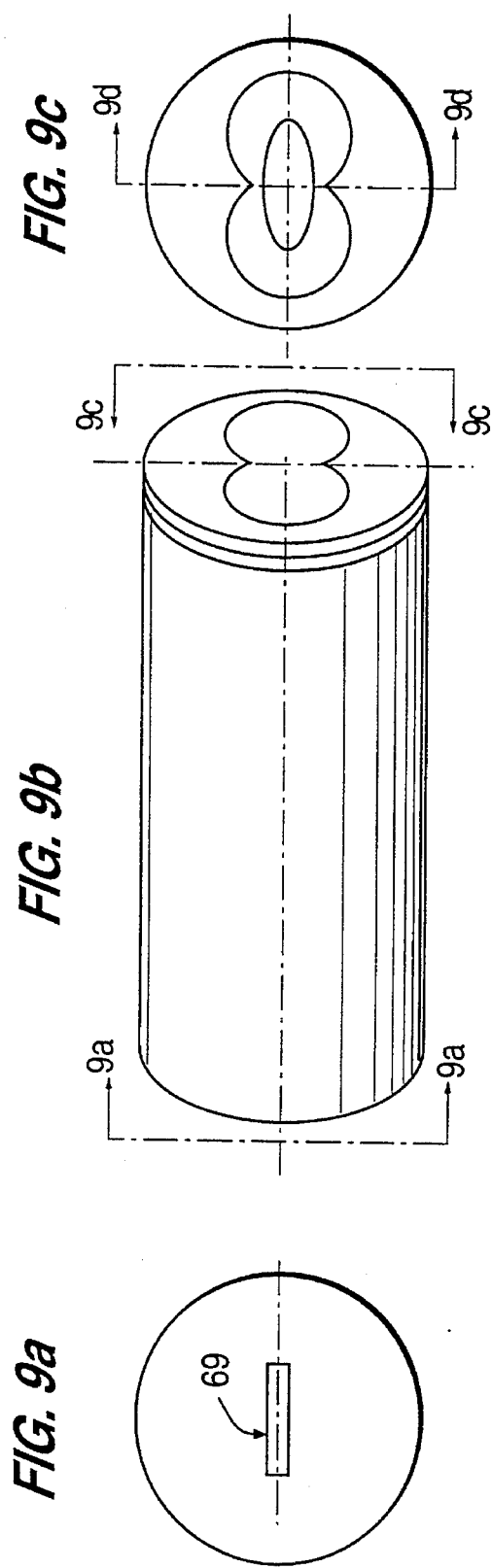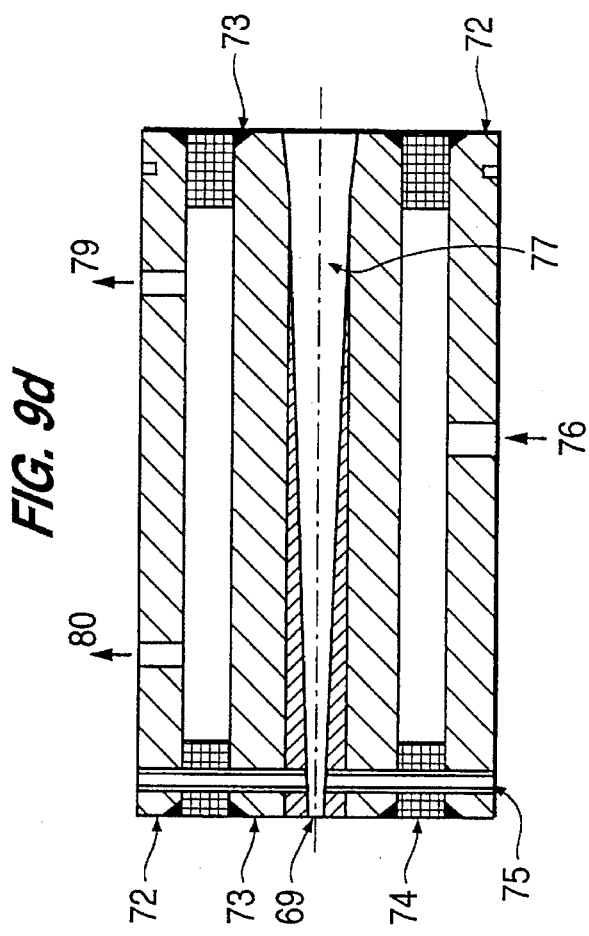

EXTRUSION INACTIVATION OF PROTEASE ENZYME IN FISH AND FISH FOOD PRODUCTS

BACKGROUND OF THE INVENTION

The present invention relates to food products made from protease enzyme containing fish, processes to make such food products, and processes to inactivate protease enzyme in fish, such as arrowtooth flounder.

Alaska's flatfish resource is one of the largest in the world. Arrowtooth flounder, which constitutes about 65% of the flatfish biomass (excluding halibut) is presently unmarketable because of the presence of protease enzyme that degrades myosin. Enzymatic degradation of myosin during normal cooking leads to excessive softening of muscle resulting in an unacceptable paste-like texture of the cooked product. Lack of a suitable technology to inhibit/destroy protease in fish muscle, such as arrowtooth muscle, is preventing utilization of a vast untapped arrowtooth flounder resource off Alaska.

Some attempts have been made to produce injected fillet and surimi using protease inhibitory additives. However, distribution and diffusion of inhibitors to enzyme sites present a problem with injection technology. Further, surimi technology, if and when available, will utilize less than 20% of the harvested resource. The remainder of the harvest (more than 80%) will be discarded as processing waste.

SUMMARY OF THE INVENTION

The principal advantage of the present invention is the provision of a way to make use of the entire or almost the entire edible portions of fish containing protease enzyme, thus minimizing processing waste.

An additional advantage of the present invention is the development of food products from fish containing protease enzyme.

A further advantage of the present invention is the development of a process which will effectively inactivate protease enzyme in fish containing such enzymes in such a manner that the inactivation still permits products resulting from the process to be used as a food product.

Additional features and advantages of the present invention will be set forth in part in the description which follows, and in part will be apparent from the description, or may be learned by practice of the present invention. The objectives and other advantages of the present invention will be realized and attained by means of the elements, combinations, and process steps particularly pointed out in the appended claims.

In order to accomplish the above advantages, the process of the present invention includes mixing protease enzyme containing fish meat or muscle with a starchy and/or proteinaceous material to form a mixture; and introducing this mixture into a screw extruder having barrel sections. At least one of the barrel sections is a reaction zone wherein the protease enzyme in the mixture is inactivated. At least one additional barrel section is located before the reaction zone to maintain the temperature of the mixture below the enzyme activation temperature of the fish meat or muscle.

The present invention also relates to the resulting product formed by the above process.

It is to be understood that both the foregoing general description and the following detailed description are exemplary and explanatory only and are not restrictive of the present invention, as claimed.

The accompanying drawings, which are incorporated in and constitute a part of this specification illustrate several embodiments of the present invention and together with the description, serve to explain the principles of the present invention.

BRIEF DESCRIPTION OF THE DRAWINGS

FIG. 1 is a flow-diagram of one embodiment of the process of the present invention.

FIGS. 8a–e and 9a–d are expanded perspective views depicting preferred die designs.

DETAILED DESCRIPTION OF THE PRESENT INVENTION

Figure 2A:
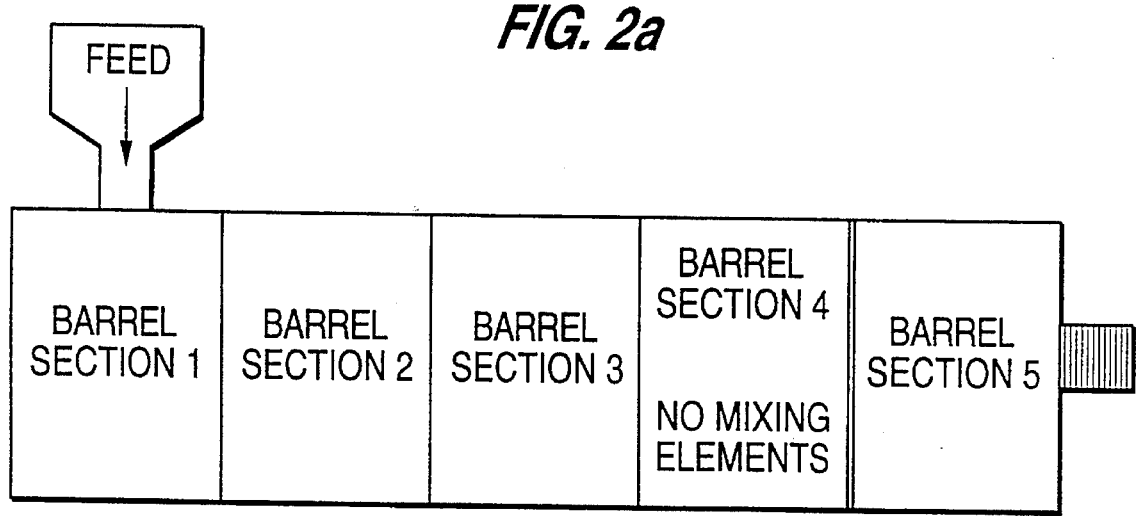
FIGS. 2a, 2b, and 2c show schematic diagrams of various screw configurations within a twin screw extruder for carrying out at least a part of the process of the present invention.

Reference will now be made in detail to the present invention and its preferred embodiments.

Fish muscle (also referred to herein as fish meat) from protease enzyme containing fish, such as arrowtooth flounder (*Atheresthes stomias*), can be processed by the present invention. The present invention is also applicable to other fish species which have a similar enzymatic muscle softening problem, such as Pacific whiting (*Merluccius productus*), Pacific hake (*Merluccius luccius productus*), Peruvian hake (*Merluccius gayi peruanus*), Yellowfin sole (*Limanda aspera*), and menhaden (*Brevoorti tyrannus*), and the like.

In the present invention, one method to inactivate protease enzyme in protease enzyme containing fish meat, such as arrowtooth flounder, and to make consumer-ready food products, can be achieved in the following manner as shown in FIG. 1.

The fish meat or muscle to be used in the process of the present invention can be obtained by removing the inedible portions of the fish, which include the head, guts, and backbone. One way of preparing the fish meat to be used in the present invention is as follows.

A protease enzyme containing fish, such as arrowtooth flounder, can be prepared for mincing by heading, gutting, and/or filleting the fish as those terms are understood to those skilled in the art. Such fish preparation is known in the art, and, for instance, any fish filleting machine, such as a BAADER 175, can accomplish the filleting. Once this initial preparation is completed, the fish is minced to remove the fish muscle from the skin and bones of the fish. Again, such mincing operations are known to those skilled in the art, and any conventional mincer can be used in the process of the present invention, for example, a belt and drum mechanical mincer (BAADER 697). In the present invention, the fish meat is preferably minced.

In the present invention, and as an optional step, the fish meat is thoroughly mixed with at least one starchy and/or proteinaceous material, preferably at refrigerated temperatures (e.g., from about 4° C. to about 10° C.). Examples of such starchy material include, but are not limited to, wheat flour, soy flour, rice flour, corn starch, corn meal, and the like. Examples of proteinaceous material, includes, but are not limited to, soy isolate, casein, whey protein, whey powder, wheat gluten, rice gluten, egg white powder, and the like. The starchy and/or proteinaceous material absorbs the moisture from the fish muscle, acts as a binder with the fish muscle, and also increases the viscosity of the fish muscle after being mixed with the starchy and/or proteinaceous material, and forms a viscous paste.

Mixing allows the enzyme in the fish to be distributed substantially uniformly throughout the entire mixture of fish muscle and the starchy and/or proteinaceous material. Generally, any mixer can be used in the process of the present invention as long as it accomplishes this function. One example of such a mixer is a RIBBON type mixer. For a 150 lb mixture, the mixture can be run at any normal speed (e.g., between 20 to 50 rpm) for approximately ½ hour to accomplish this mixing step.

Although there is no intention to limit the fish muscle used in the process of the present invention to a particular moisture content, generally, prior to mixing, the fish muscle has a moisture content of about 70% to about 80% by weight of the fish muscle. The starchy and/or proteinaceous material is preferably added in sufficient amounts to reduce this moisture content, for example to about 40% by weight of the fish muscle. Therefore, the starchy and/or proteinaceous material is preferably added in an amount of from about 5% to about 60% by weight of the fish muscle.

In such a case, a powdery mix can be formed by using, for example, a HOBART mixer. A dry feeder, such as a K-TRON feeder, can then be used to feed the powdery mix to the extruder inlet. Thus, the fish muscle and starchy and/or proteinaceous material can be a viscous paste or powdery mass. The amount of starchy and/or proteinaceous ingredient generally used depends on the water absorption capacity of the latter. For example, soy flour has higher water absorption capacity than wheat flour.

Once the fish meat and starchy and/or proteinaceous material are thoroughly mixed, the resulting mixture is a viscous paste or powdery mass depending upon the particular starchy and/or proteinaceous ingredient used, the amount of starchy and/or proteinaceous material used and the method of mixing. It is certainly within the bounds of the present invention to use one or more of the starchy and/or proteinaceous ingredients in the mixture. In one embodiment of the present invention, a powdery mass is obtained, for example, when soy isolate is thoroughly mixed with minced fish muscle in an amount of about 20% by weight of the fish muscle.

Moisture in the fish mince may also be removed by processes such as squeezing before the mince is processed in the extruder. Another method of removing moisture from the fish mince can occur in the extruder itself by drawing a vacuum from a barrel section towards the end of the extruder immediately after an appropriate restriction created by a screw design. If needed, removal of moisture can be continued after the processed material exits from the extruder by further moisture removal means well known to those skilled in the art, e.g., by drying.

Figure 6:
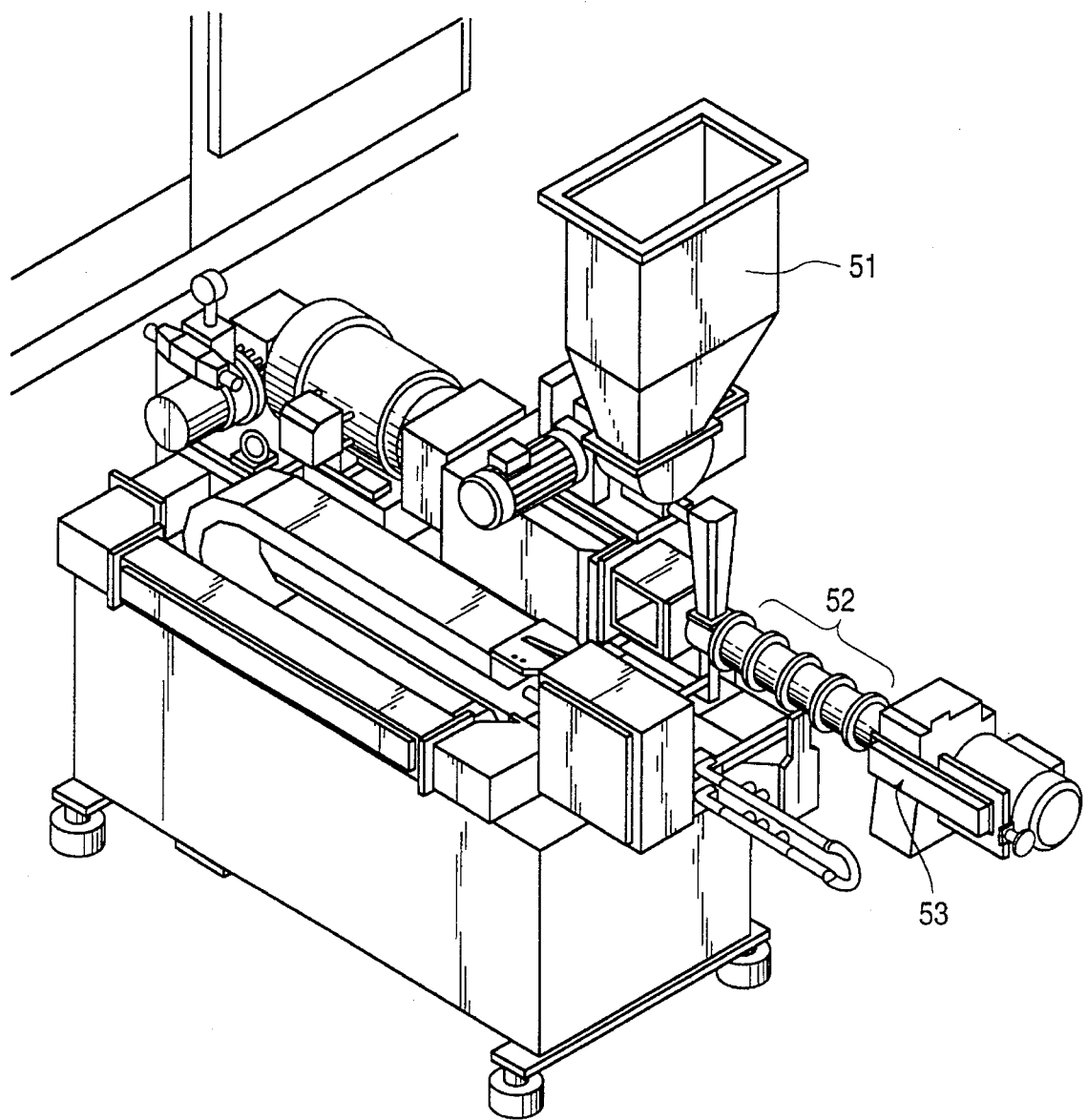
FIGS. 6 and 7a are drawings illustrating different parts of a typical food extruder.
Figure 7A:
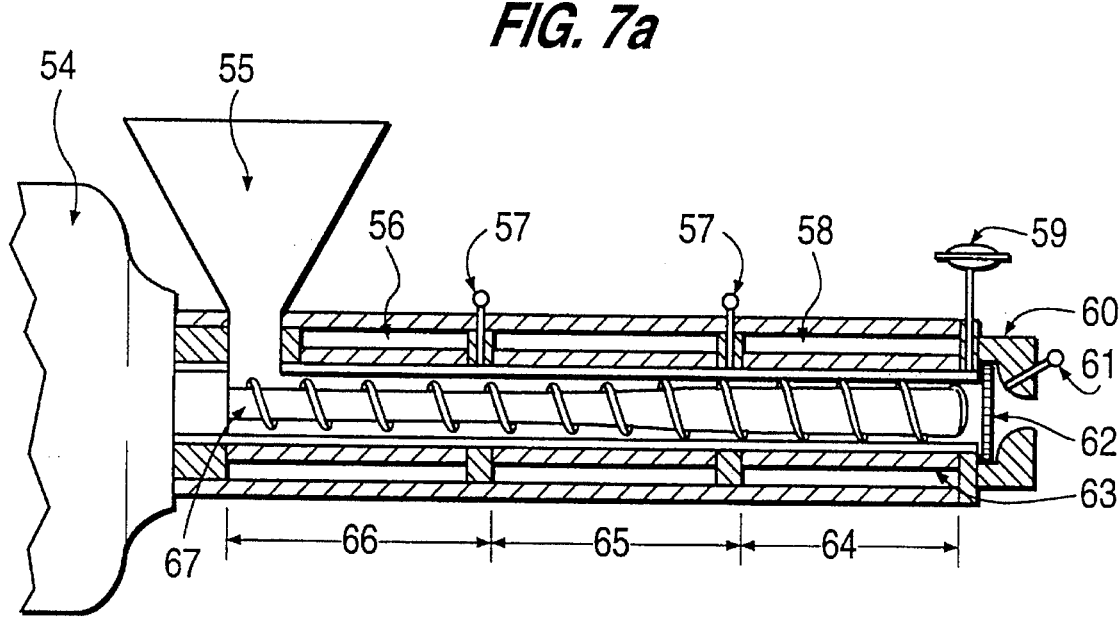

The mixture of fish meat and starchy and/or proteinaceous material is then introduced into a screw extruder such as the one shown in FIGS. 6 and 7a. An extruder is a device which continuously processes a food material at high temperature and short time (HTST). Raw/processed material is fed into an elongated barrel by a feeder (51), wherein the material is conveyed by one or more screws in the barrel assembly (52) and subjected to mixing, heat, and shear. By controlling the feed material composition, feed rate, screw speed, mixing, and thermal and shear energy inputs to the material, it is possible to impart desirable product attributes such as texture and nutrition content. Any means can be used to introduce the mixture into the extruder such as the use of a sanitary pump, for instance, a MOYNO pump. The screw extruder permits a unique, high-temperature, short-time (HTST) processing of the mixture in order to inactivate the enzyme in the mixture.

Protease in arrowtooth muscle, for example, exhibits minimum proteolytic activity below 40° C. and has maximum activity between 55° C. and 60° C. The enzyme activity drops rapidly above 60° C. Less softening of arrowtooth muscle occurs with rapid heating suggesting inactivation of protease by denaturing the enzyme. The sharp drop in enzyme activity above 60° C. permits the use of HTST processing to inactivate this enzyme.

HTST processing of food offers better retention of nutrients and quality characteristics (color, flavor, texture) compared to conventional thermal processing such as canning. Two important terms used in thermal processing that describe response of a system's kinetics to temperature change are the D and z values. They are the basis of thermal process calculations. D value (decimal reduction time) is defined as time in minutes for 90% reduction of original enzyme concentration or microbial population. The term z value represents the temperature range in ° F. for a 10:1 change in decimal reduction time. HTST processing is based on the fact that heat-labile enzymes and microorganisms have much smaller D and z values than do nutrients and quality factors. The rates of destruction that have small z values are highly temperature dependent; whereas rates with large z values are less influenced by temperature. A given increase in temperature causes a larger increase in the rate of destruction of enzymes and microorganisms than in the rate of destruction of nutrients and quality factors. This enables HTST processing of foods with higher retention of nutrients Increased water activity ($a_w$) enhances the denaturation of enzyme protein. In the presence of excess moisture, enzymes generally are much more temperature sensitive than microorganisms and are easily inactivated. Considering the high moisture content (66–81%) of fish muscle, protease in arrowtooth muscle, for example, is easily inactivated by HTST treatment in a food extruder, preferably a twin screw extruder.

In order to inactivate protease enzyme in fish, the process of the present invention includes direct feeding of protease containing minced fish muscle or the protease containing minced fish muscle preferably mixed with a starchy and/or proteinaceous material, and introducing this mince or mixture into a single screw or a multiple-screw extruder. The extruder permits a unique high temperature short time (HTST) processing of the minced muscle or mixture in order to inactivate the enzyme in the mixture.

In the process of the present invention, the mixture of fish muscle and starchy and/or proteinaceous material can be heated in a food extruder to very high barrel temperatures (e.g., 200° C.–300° C.) by a combination of mechanical and thermal energy with a very short residence time (about 1 to about 2 minutes).

For purposes of the present invention, the extruder, as shown in FIGS. 6 and 7a, is made up of a barrel, a screw (e.g., single, twin, or multiscrew), a feeder, a die, a cutter, a drive-gear reducer and thrust bearing (54), drive motor, and a heating and cooling arrangement with temperature control.

Figure 7B:
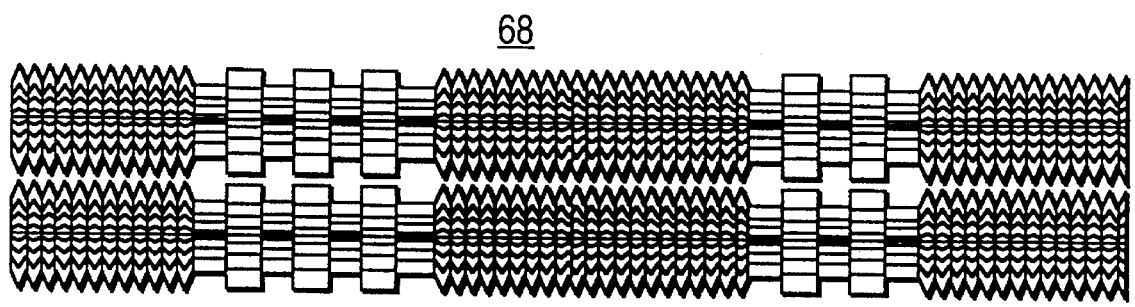
FIG. 7b is a picture of a twin screw arrangement.

In further detail and referring to FIG. 7a, generally a food extruder has a drive, gear reducer, and thrust bearing (54), a feed hopper (55), a cooling water jacket (56), thermocouples (57), a barrel steam jacket (58), a pressure transducer (59), a die (60), a discharge thermocouple (61), a breaker plate (62), a barrel with a hardened liner (63), a metering section (64), a compression section (65), a feed section (66), and a screw with increasing root diameter (67). In FIG. 7b, a picture is shown of a twin screw arrangement that can be used in a food extruder.

Figure 2B:
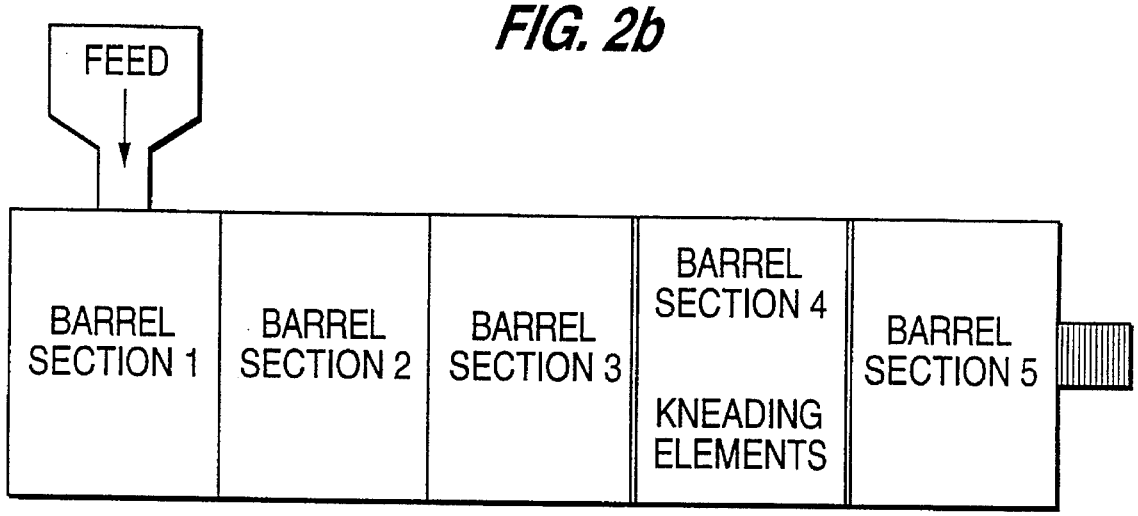
Figure 2C:
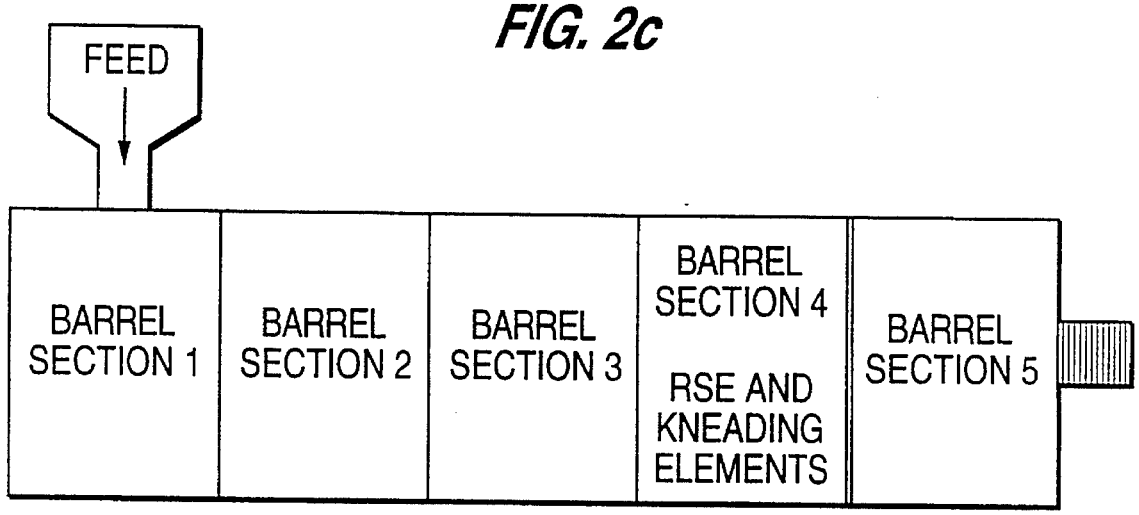

The barrel in the extruder to be used in the present invention has several barrel sections and preferably has four, and more preferably five or six barrel sections as shown in FIGS. 2a, 2b, and 2c. At least one of these barrel sections is the main reaction zone where the HTST processing occurs. The barrel sections prior to the main reaction zone permit a gradual increase in temperature of the fish muscle/starchy and/or proteinaceous material mixture prior to the mixture entering into the barrel section(s) which is the main reaction zone. In particular, in the barrel sections before the reaction zone, the temperature of the fish meat should not reach the maximum or optimal activation temperature of the protease enzyme in the fish meat (e.g., for arrowtooth flounder fish meat, a temperature of 40°–55° C.).

Activation of the protease enzyme of the fish meat prior to entering the reaction zone would cause the microscopic muscle structure to break down leading to an undesirable and unusable food product. In the reaction zone, the temperature of the fish meat is raised rapidly so that substantial activation of the protease enzyme in the fish muscle does not occur and complete inactivation results in the reaction zone due to the HTST processing.

With regard to the barrel section set-up, the first barrel section is where the mixture of fish meat and starchy and/or proteinaceous material is introduced into the extruder by means of a feeder (located above the first barrel section). Barrel section(s), e.g., a second barrel section, which may be located before the reaction zone primarily serves to convey the mixture to the reaction zone and permits additional mixing of the mixture by means of the screw arrangement in the extruder. Generally, there will be at least one barrel section for conveying the mixture prior to the reaction zone. It is preferred that the temperature of the mixture in the first barrel section and the temperature of the fish meat in the optional barrel section(s), e.g., optional second barrel section, prior to the main reaction zone be below the activation temperature of the protease enzyme in the fish meat to be processed. Generally, the temperature in the optional second barrel section will be higher than the first section and the gradual increase in temperature allows the mixture to be near, but not at, the optimal enzyme activation temperature for the fish meat in the mixture. By doing this, the HTST processing in the reaction zone is more effective since less time is spent reaching and exceeding the temperature for optimal enzyme activation.

In the conveying section of the barrel (i.e., first barrel section), the temperature of the mixture is below the enzyme activation temperature of protease enzyme containing fish. In the case of arrowtooth flounder, the temperature of the mixture is below about 40° C., preferably about 5° C. to about 10° C.; and the mixture has a residence time in the first barrel section, of about 1 second to about 15 seconds, and more preferably about 2 seconds to about 10 seconds.

With regard to the optional second conveying section (i.e., second barrel section), the temperature of the mixture is still below the enzyme activation temperature of the protease enzyme containing fish. In the case of arrowtooth flounder, the temperature of the mixture is below about 40° C., preferably about 10° C. to about 20° C.; and the mixture has a residence time in the second barrel section of about 1 second to about 15 seconds, and more preferably about 2 seconds to about 10 seconds.

In the preferred embodiment, there is also an optional third barrel section (i.e., third barrel section), defined (or described) herein as a compressing section, as shown in FIGS. 2a, 2b, and 2c. The temperature of the mixture in this optional section is still below the enzyme activation temperature, which for arrowtooth flounder is at least about 40° C., preferably about 35° C. to about 40° C.; and the mixture has a residence time in this optional third barrel section of about 1 second to about 20 seconds, and more preferably about 2 seconds to about 15 seconds.

A schematic of the barrel sections of a twin-screw extruder along with illustrative location of the mixing elements such as kneading and reverse screw elements is shown in FIGS. 2a, 2b, and 2c. Screw configuration 1 (mild) of FIG. 2a was built from the following screw elements: 50/50/2, 33.3/50/3, 25/50/3, and 16.6/50/2. These specifications are read as follows: pitch/length of screw element/number of screw elements. The total length of this combination of screw elements is 500 mm.

Figure 3:
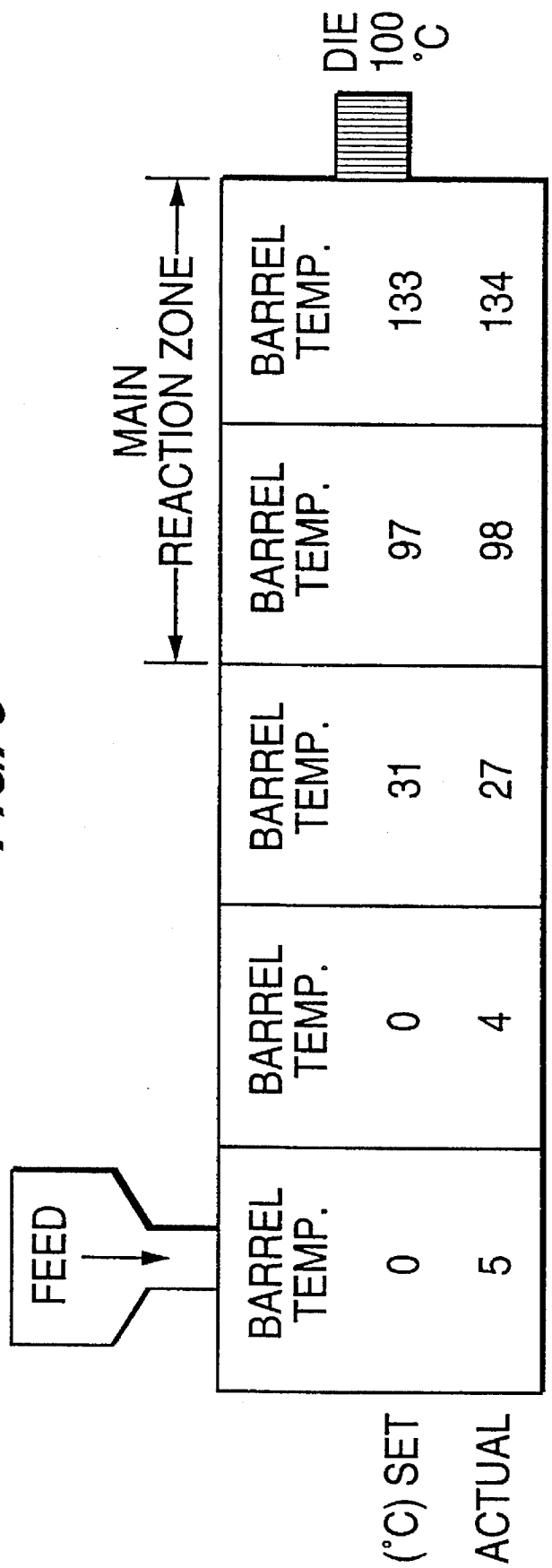
FIG. 3 is a schematic diagram of a typical temperature profile within an extruder in accordance with the present invention.

Protease enzyme in arrowtooth flounder, for example, is completely inactivated in a Clextral BC-21 twin-screw extruder using screw configuration 1 (mild), the barrel temperature profile shown in FIG. 3, and a screw speed of 100 rpm. In one example of the present invention, the main reaction zone consisted of barrel sections 4 and 5 wherein the actual barrel temperatures were 90° C. and 134° C. Enzyme inactivation under conditions described above is illustrative only. An inactivation profile can be changed by manipulating variables such as screw configuration, screw speed, and flow rates. For example, there is negligible enzyme activity below a meat/mixture temperature of 50° C. at the die (as shown in the graphical representation of FIG. 4) with a mild screw configuration (FIG. 2a), while for a severe screw configuration shown in FIG. 2c, enzyme activity starts from a lower temperature of 40° C. (as shown in the graphical representation of FIG. 5), with other conditions such as screw speed and flow rate remaining the same for the two screw configurations.

A wide choice of factors, such as screw configuration and screw speed for inactivating protease in fish are possible. These factors also affect the structure of the fish muscle due to their effects on energy inputs to the material. Any combination of the variables are acceptable as long as the protease is inactivated using the HTST processing. In view of the present invention, manipulation of extrusion variables such as screw configuration, screw speed, and flow rate can be easily achieved to inactivate protease in a protease containing fish by one skilled in the art. A typical product temperature in the die at exit of the extruder for inactivating protease in arrowtooth flounder fish meat using a Clextral BC-21 is about 100° C.

Although there is no intention to be limited to any particular temperature or time used in the process of the present invention, in the reaction zone the "high temperature" in HTST is a temperature in which complete inactivation of the protease enzyme is achieved in the mixture. In the case of arrowtooth flounder, this is at least about 100° C., and preferably about 100° C. to about 110° C. The "short time" in HTST is about 5 seconds to about 30 seconds, and more preferably about 5 seconds to about 20 seconds. In view of the present invention, one skilled in the art can easily choose optimum high-temperature, short-time processing parameters or conditions in the reaction zone (and/or other zones) of the extruder without undue experimentation to achieve the inactivation of the protease enzyme in fish and to obtain the food products in accordance with the present invention. This HTST capability of food extruders destroys protease in protease containing fish, for example arrowtooth muscle, within a few seconds without sacrificing nutritional value and quality characteristics of muscle proteins. The HTST treatment preferably occurs in the third barrel segment of the extruder (when there is at least a total of four barrel segments) and preferably occurs in the fourth barrel segment (when there is at least a total of five or six barrel segments).

After the main reaction zone, there is an optional texturization zone. Generally, at least one barrel section along with the die comprises this texturization zone. In this zone, the now inactivated fish mixture is subjected to barrel temperatures of at least about 200° C., preferably about 200° C. to about 300° C., and more preferably about 200° C. to about 250° C. In the texturization zone, the fish mixture is converted to a fibrous texture that is easily formable into any desired shape. Accordingly, the texturization zone is used when it is intended to shape the fish mixture for food product use.

If no texturization zone is used, the barrel sections subsequent to the reaction zone can be used as a cooling section(s) (the fourth or fifth barrel sections).

The above discussion is based on each barrel section having a length of 100 mm.

Accordingly, the enzyme inactivation using the high-temperature, short-time processing in the reaction zone can be achieved by manipulating screw configuration, temperature profile, die design, and residence time in the reaction zone within the extruder.

In particular, the screw configuration can manipulate mixing, residence time, and energy inputs to the feed material. In one embodiment, the screw profile typically consisted of elements of larger pitch of 50 mm in a conveying section (first and second segments of barrel). This pitch is preferably gradually reduced to 33.3 mm, 25 mm, and 16.6 mm. The total length of the screw in the screw extruder (made up of 25 mm elements and 50 mm elements) is 500 mm. Any length of screw is acceptable as long as the protease in the mixture of fish muscle and starchy and/or proteinaceous ingredients are inactivated. In the reaction zone within the extruder, a reverse pitch screw element and/or a kneading element can preferably be incorporated. There are numerous screw configurations possible in view of the present invention; three preferred screw configurations in terms of mixing and shear are mild, intermediate, and severe as set forth in FIGS. 2a, 2b, and 2c, respectively.

In FIGS. 2a, 2b, 2c, and 3, a barrel having five sections is shown. The screw configurations in FIGS. 2a, 2b, and 2c all have conveying sections. In FIG. 2a, the reaction zone has no mixing elements. In FIG. 2b, the reaction zone has a kneading element. In FIG. 2c, the reaction zone has a reverse pitch screw element and a kneading element.

An example of one acceptable twin-screw extruder is a Clextral BC-21. With this particular type of extruder, a speed of about 50 rpm to about 400 rpm, and preferably about 100 rpm to about 300 rpm can be used with a residence time in the main reaction zone of about 5 to about 30 seconds. Further, the temperature range within the reaction zone must be sufficient to completely inactivate the protease enzyme in the fish being processed. For arrowtooth flounder, this temperature is approximately 100° C. to about 110° C.

FIG. 3 shows the typical temperature profile of the segments or barrel sections in the extruder. With this type of set-up as shown in FIG. 3, the mixture of minced fish meat with starchy and/or proteinaceous material is slowly warmed up in the conveying sections but is not heated beyond the activation temperature (e.g., 40° C. for arrowtooth flounder) until it is introduced into the reaction zone. Otherwise, the enzymes would be activated within the fish. Upon entering the reaction zone in the extruder, which is generally 100 mm in length, the temperature of the fish meat mixture is such that the protease enzyme is completely inactivated (e.g., at least about 100° C. to about 110° C. in order to inactivate the enzyme in the arrowtooth flounder). With screw speeds of approximately 100–300 rpm, the average residence time in the reaction zone will be approximately about 5 to about 30 seconds which is sufficient to inactivate completely the enzyme. Generally, the reaction zone can be located anywhere in the extruder as long as at least one conveying section is located before the reaction zone. Preferably, the reaction zone is located 100–200 mm from the end of the extruder. Screw speeds and flow rate can easily be varied by one skilled in the art to achieve the desired residence time in the reaction zone.

Figure 4:
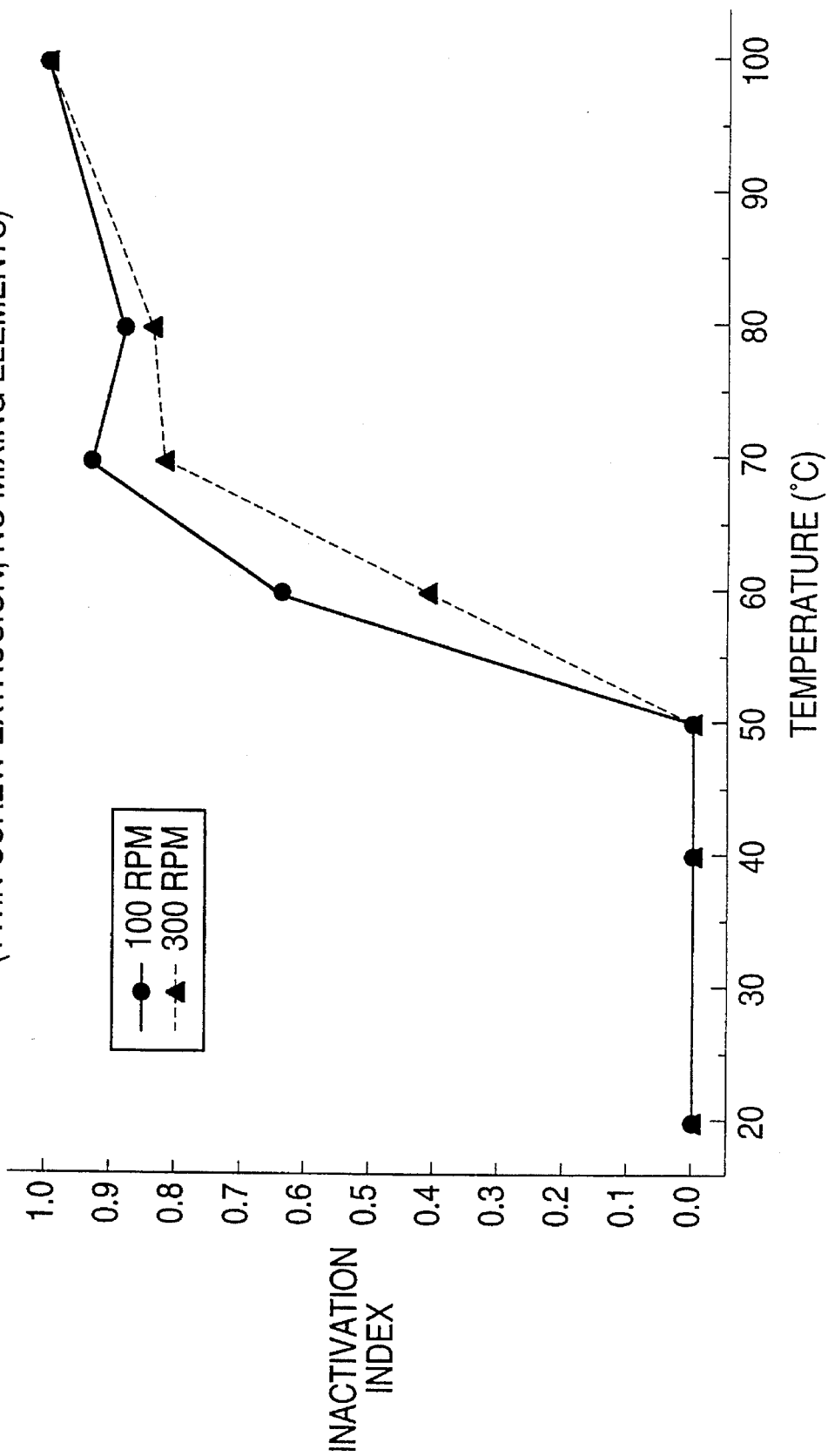
FIGS. 4 and 5 are graphs showing the correlation between temperature and enzyme inactivation in arrowtooth flounder during extrusion.

As the data in FIG. 4 show, for arrowtooth flounder, enzyme inactivation (using just twin-screw extrusion with no mixing elements) does not begin until a temperature of 50° C. is obtained when the screw speed is either 100 rpm or 300 rpm.

Figure 5:
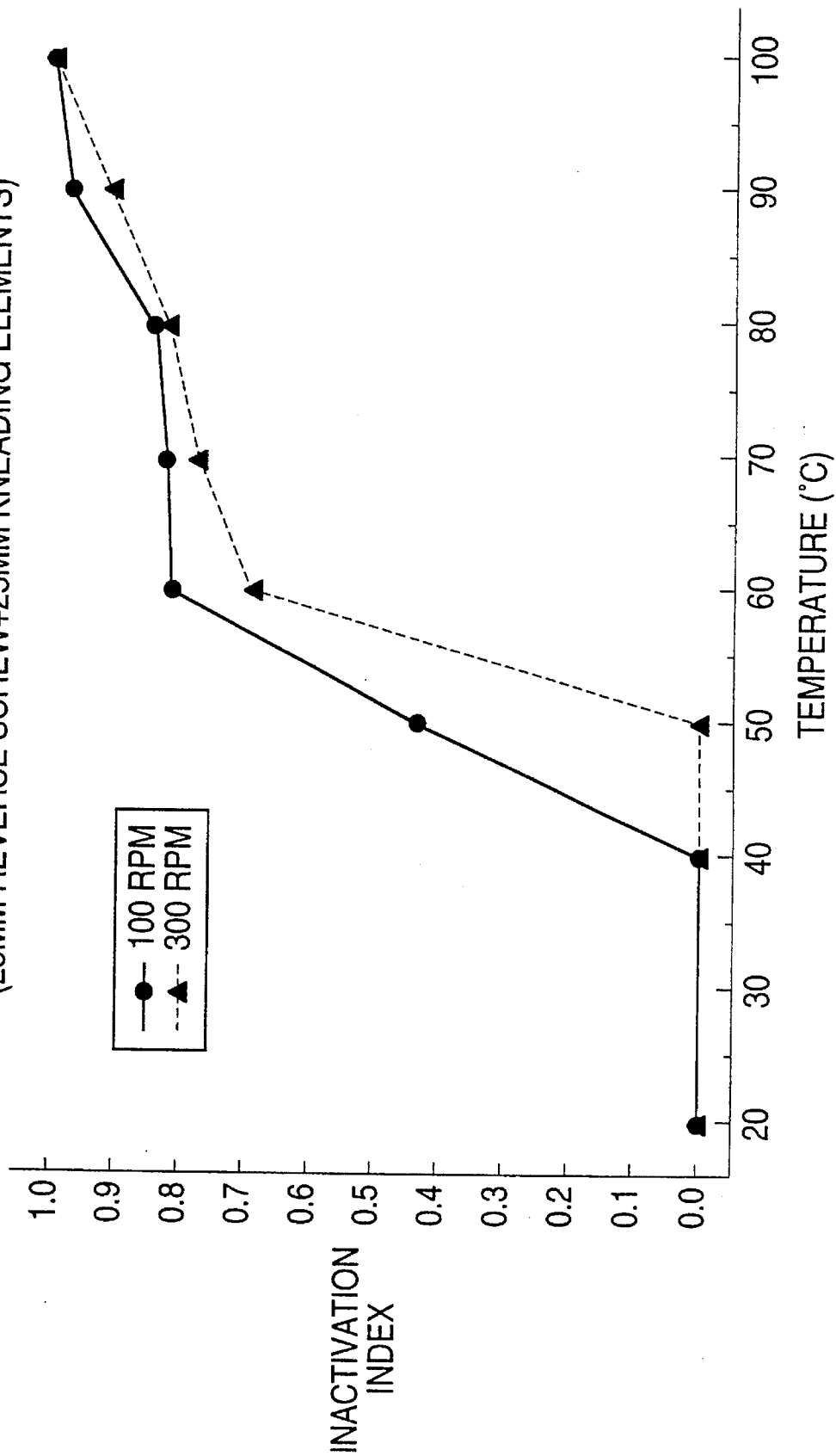

Also, as the data in FIG. 5 show, enzyme inactivation for arrowtooth flounder (using 25 mm reverse screw and 25 mm kneading elements in the reaction zone) does not begin until a temperature of 40° C. is obtained when the screw speed is 100 rpm; and 50° C. when the screw speed is at a much faster rate, i.e., 300 rpm. Substantially complete inactivation then occurs as can be seen in FIGS. 4 and 5 depending upon temperature and screw speed, but generally substantially complete inactivation of the fish meat mixture will occur when the temperature of the fish meat mixture is in the range of 70°–110° C.

After the HTST treatment, the other ingredients are added and mixed and the mixture is processed in subsequent segments to produce value-added consumer-ready food products. In accordance with the process of the present invention, enzyme inactivation and production of consumer-ready food products are combined in a single energy efficient, rapid, and continuous process.

At the end of the texturization zone, the mixture exits from the die, which forms and shapes the mixture. The die can be any design.

Two die designs for texturization of the food product of the present invention are described below. FIG. 8a–e illustrates a texturizing die without temperature control while FIG. 9a–d show a variation of the design with facilities for temperature control. Referring to FIG. 8b, flow of material is from 8c to 8a. The die designs are compatible to different extruder types such as single screw and twin screw extruder.

The die hole inlet in the die of FIG. 8a–e is circular and matches with the outlet hole from the die head of the extruder. Side-View 8c—8c shows the circular die hole inlet. In FIGS. 8a and d, and with regard to the texturizing die without temperature control, this die has a die opening (69), an outer shell (70), and a circular insert (71). The circular hole transits to an elliptical shape as shown in section 8e—8e. Further transition of the shape takes place along the length of the insert to obtain the desired product shape at the die end. A transition from an elliptical shape to a desired shape at the die end is a unique feature of the die design. In FIG. 8e, the final shape is shown as a rectangular die opening for the purposes of illustration.

The texturization die with temperature control, shown in FIG. 9a–d, can be attached directly to the extruder barrel. With respect to the texturizing die of FIG. 9a and d, this die also has a die opening (69), an outer shell (72), a circular shell (73), a ring insert (74), and a port for pressure or temperature sensor (75). FIG. 9d also shows where the fluid enters the die for purposes of cooling or heating (76), and further shows where the fluid exits (79, 80). Lastly, various welded joints (78) are shown. The Side-View 9c—9c illustrates a texturization die for a twin screw and Side-View 9a—9a shows a rectangular die opening; however, in accordance with the present invention, it can be of any conventional shape or design. Transition from an elliptical shape to a desired shape at the die end is again part of the die design. Temperature control (FIG. 9d, Sectional View 9d—9d) is by heat transfer from or to a circulating fluid through the hollow die. This temperature control can effectively lower the temperature of the material after exiting the reaction zone and optionally the texturization zone. For instance, in the case of arrowtooth meat, in the texturization zone the barrel temperature is from about 200° to 300° C.; while in the die, the material can be cooled to about 5° C. to about 80° C. The circular shell (see FIG. 9d) can also be hollow wherein heating coils can be inserted for supplying thermal energy, if necessary, to the material flowing through the texturizing die.

Length of both the texturizing dies shown in FIGS. 8a–e and 9a–d can be extended by similar attachments (sections), and can further have features for varying the size and shape of the final product. One way to have flexibility in this regard is to have replaceable inserts with different designs. Both the hot and cold die can be used to texturize a fish product. In the present invention, the mixture of fish muscle and starchy and/or proteinaceous material can be heated in the Clextral BC-21 extruder to very high temperatures (e.g., 300° C. barrel temperature) by a combination of mechanical and thermal energy.

A multiple texture food product can be formed by attaching a co-extrusion die to the die end of the extruder. This permits, for instance, the fish food product to be covered by a different ingredient such as potatoes, flour, and the like.

After exiting the die in the desired shape, the shaped mixture is cut into desired lengths by a conventional cutter and can then be subsequently smoked, refrigerated, frozen, and/or packaged.

Furthermore, additives such as spices, seasonings, colorants, nutrients, and anti-oxidants to enhance flavor, color, nutrition, and shelf life can be added during the process of the present invention. Examples of such additives include, but are not limited to coriander, ginger, onion powder, pepper, salt, and vinegar. Flavoring, coloring, and other ingredients can be added to the feed material before entering the extruder, in the extruder, or after the material exits from the extruder.

Some examples of methods of smoking, freezing, and packaging are described in the following references, incorporated in their entireties, herein by reference: *Freezing and Irradiation of Fish*, R. Kruezer Ed., Fishing News (Books) Ltd., London, England; *The Freezing Preservation of Foods*, Vols. 1–4, Tressler et al. Ed., The AVI Publishing Company, Inc., Westport, Conn., 1968; *Fundamentals of Food Freezing*, Desrosier et al. Ed., The AVI Publishing Company, Inc., Westport, Conn.; *Packaging—Specifications, Purchasing and Quality Control*, Third Ed., Edmund A. Leonard, Marcel Dekker, Inc., New York, N.Y.; *Food Packaging and Preservation*, M. Mathlouthi Ed., Elsevier Applied Science Publishers, London and New York; *Principles of Food Packaging*, Second Ed., Sacharow et al. Ed., AVI Publishing Company, Westport, Conn.; *Introduction to Fish Technology*, Regenstein et al., Von Nostrand Reinhold, New York, N.Y., pp. 127–131; *Smoked Fish Manual*, B. Paust et al. Ed., Alaska Sea Grant Report 82-9, Alaska Sea Grant College Program, University of Alaska, December 1982; and *Fish Handling & Processing*, Aitken et al. Ed., Ministry of Agriculture, Fisheries & Food, Torry Research Station, Edinburgh, pp. 98–114.

It is also within the scope of the present invention to use other additives and process steps which do not interfere with the inactivation of the protease enzyme in fish or the resulting food product. For example, the process of the present invention can be modified by raising the temperatures in all or part of the extruder barrels above 200° C. and feeding a mixture of fish mince and starchy and/or proteinaceous ingredient, and forming and shaping the extrudate, preferably through a die having a design illustrated in FIGS. 8a–e and 9a–d.

The present invention will be further clarified by the following examples which are intended to be purely exemplary of the present invention.

EXAMPLE 1

Protease in arrowtooth mince (without any starchy and/or proteinaceous ingredients) was inactivated under the following conditions. A Clextral BC-21 twin-screw extruder was used having a screw configuration consisting of only conveying elements (no mixing elements) similar to that shown in FIG. 2a. Screw configuration from feed to die end was: 50/50/2, 33.3/50/3, 25/50/3, and 16.6/50/2. These specifications are read as follows: pitch/length of screw element/number of screw elements. The total length of this combination of screw elements was 500 mm. The barrel temperature profile in the five barrel sections from feed to die was 0°, 0°, 47°, 110°, 140° C., respectively. Arrowtooth mince was mixed with 1% (by total weight of mixture) soy isolate and was fed to the extruder using a MOYNO pump. The screw speed, throughput, and product temperature at the die were 300 rpm, 18 kg/hr, and 99° C., respectively. The die was circular with a diameter of 10 mm. Protease enzyme in the arrowtooth mince was completely inactivated.

EXAMPLE 2

The following example shows that a dual textured or multiple-textured product can be formed using minced fish. Using the Clextral BC-21 twin-screw extruder, a dual textured product was produced by first inactivating protease enzyme in arrowtooth using the extruder and procedures in Example 1. Then, the extruded arrowtooth meat was fed into the inner core of a co-extrusion die using a MOYNO pump. The outside coating was rice flour which was fed as a powder from a hopper to the extruder. The screw configuration from feed to die end was: 50/50/2, 33.3/50/3, 25/50/3, and 16.6/50/2. The specifications are read as follows: pitch/length of screw element/number of screw elements. The total length of this combination of screw elements was 500 mm. The barrel temperature profile in the five barrel sections from feed to die was 20°, 40°, 60°, 80°, 100° C., respectively. The screw speed, throughput, and product temperature at the die were 100 rpm, 12 kg/hr, and 70° C., respectively. A well formed dual texture product was formed. This product could then be further coated using a dipping or spraying process to form a multiple-textured product, if desired.

EXAMPLE 3

The following example shows that a textured product can be formed using a hot die or a cold die by manipulating independent process variables such as screw configuration, die design and temperature profile. A mix of arrowtooth flounder and 25% (by total weight of mixture) wheat flour was processed in a Clextral BC-21 twin-screw extruder using a mild screw configuration (no mixing elements) similar to FIG. 2a. Screw configuration from feed to die end was: 50/50/2, 33.3/50/3, 25/50/3, 25/25/1, 16.6/50/3, and 16.6/25/1. These specifications are read as follows: pitch/length of screw element/number of screw elements. The total length of the barrel was 600 mm with 6 barrel sections of 100 mm each. Flow rate was 18 kg/hr and screw speed 200 rpm. Set barrel temperatures were 200° C. in the first barrel section and 265° C. in the other 5 barrel sections. The actual barrel temperature was lower than the set barrel temperature, and the material temperature in the extruder was lower than the actual barrel temperature. For example, in the first and sixth (adjacent to the die head) barrel section the actual barrel temperatures were 43° C. and 265° C., respectively, and the material temperature inside the sixth barrel section was 198° C. A slit die (15 mm×2 mm) was used, and the material temperature was 144° C. in the die. A well textured fibrous structure was formed in a continuous strip under the above conditions.

EXAMPLE 4

The following example shows that a textured product can also be made from minced fish which do not have protease problems. A mix of 75% minced salmon and 25% (by total weight of mixture) wheat flour was extruded in a Clextral BC-21. Screw configuration from feed to die end was: 50/50/2, 33.3/50/3, 25/50/2, KB/5/5, LH16.6/25/1, 25/25/1, 16.6/25/1, KB/90/5/5, LH16.6/25/1, and 16.6/50/2. These specifications are read as follows: pitch/length of screw element/number of screw elements (LH=left hand thread; KB/5/5=kneading/length/number). The total length of the barrel was 600 mm with 6 barrel sections of 100 mm each. Set barrel temperature are 220° C. throughout. The actual barrel temperatures from feed to die end were 39°, 104°, 172°, 216°, 220°, 220° C., respectively. A rectangular die section 35 mm×5 mm produced a well textured product at 200° C. barrel temperature. Flow rate of the mix was 23 kg/hr. A well structured fibrous product was formed.

EXAMPLE 5

The following example shows that a textured product can be made from deep water fish species such as giant grenadier which has very high moisture content (approximately 90%). A mix of 60% giant grenadier mince and 40% (by total weight of mixture) wheat flour was extruded in a Clextral BC-21. Screw configuration from feed to die end was: 50/50/2, 33.3/50/3, 25/50/3, 25/25/1, 16.6/50/3, and 16.6/25/1. These specifications are read as follows: pitch/length of screw element/number of screw elements. The total length of the barrel was 600 mm with 6 barrel sections of 100 mm each. The set barrel temperature was 220° C. throughout. The actual barrel temperatures from feed to die end in six sections were 39°, 100°, 166°, 202°, 218°, and 220° C., respectively. The product temperature in the die was 139° C. Flow rate of the mix was 18 kg/hr and screw speed was 100 rpm. A rectangular slit die (15 mm×2 mm) produced a well textured product at barrel temperature of 220° C.

Other embodiments of the present invention will be apparent to those skilled in the art from consideration of the specification and practice of the present invention disclosed herein. It is intended that the specification and examples be considered as exemplary only with the true scope and spirit of the invention being indicated by the following claims.

What is claimed is:

1. A method of inactivate protease enzyme in fish muscle having said enzyme in a portion thereof comprising:

mixing said fish muscle with a starchy and/or proteinaceous material to form a mixture; and passing said mixture through a screw extruder having at least two barrel sections wherein in a first barrel section the temperature of said mixture is maintained below the activation temperature of said enzyme, and downstream of said first barrel section a barrel section having a reaction zone and in which is maintained a temperature sufficient to cause complete inactivation of the protease enzyme in said mixture.

2. The method of claim 1, wherein said starchy material is selected from the group consisting of wheat flour, soy flour, rice flour, corn starch, and corn meal; and said proteinaceous material is selected from the group consisting of soy isolate, casein, whey protein, whey powder, wheat gluten, rice gluten, and egg white powder.

3. The method of claim 1, further comprising the step of smoking said mixture after exiting said screw extruder.

4. The method of claim 1, wherein said screw extruder is a twin screw extruder.

5. The method of claim 1, wherein the screw speed of said screw extruder is from about 50 rpm to about 400 rpm.

6. The method of claim 1, wherein said mixture in said reaction zone is heated to a temperature from about 100° C. to about 110° C.

7. The method of claim 1, wherein said fish is arrowtooth flounder, Pacific whiting, Pacific hake, Peruvian hake, Yellowfin sole, or menhaden.

8. The method of claim 7, wherein said fish is an arrowtooth flounder.

9. The method of claim 1, wherein said reaction zone contains a kneading element.

10. The method of claim 1, wherein said reaction zone contains a reverse pitch screw element.

11. The method of claim 1, wherein said reaction zone is about 100 mm in length.

12. A food product comprising said mixture resulting from the method of claim 1.

13. The food product of claim 12, wherein said fish meat is arrowtooth flounder, Pacific whiting, Peruvian hake, Yellowfin sole, or menhaden.

14. The food product of claim 13, wherein said fish meat is arrowtooth flounder.

15. A method of making a food product from fish muscle containing protease enzyme comprising:

mixing said fish muscle with a starchy and/or proteinaceous material to form a mixture;

passing said mixture through a screw extruder having at least two barrel sections wherein in a first barrel section the temperature of said mixture is maintained below the activation temperature of said enzyme, and downstream of said first barrel section a barrel section having a reaction zone and in which is maintained a temperature sufficient to cause complete inactivation of the protease enzyme in said mixture.

16. The food product of claim 15.

17. The method of claim 15, further comprising the step of passing said mixture through a texturization zone located after said reaction zone, wherein said mixture is heated to a temperature of from about 200° C. to about 300° C.

18. The food product of claim 16, wherein said fish meat is arrowtooth flounder, Pacific whiting, Peruvian hake, Yellowfin sole, or menhaden.

19. The food product of claim 18, wherein said fish meat is arrowtooth flounder.

20. The method of claim 15, wherein said fish is arrowtooth flounder, Pacific whiting, Peruvian hake, Yellowfin sole, or menhaden.

21. The method of claim 20, wherein said fish is an arrowtooth flounder.

22. The method of claim 15, wherein said reaction zone contains a kneading element.

23. The method of claim 15, wherein said reaction zone contains a reverse pitch screw element.

24. The method of claim 15, wherein said mixture in said reaction zone is heated to a temperature from about 100° C. to about 110° C.

25. The method of claim 15, wherein said multi-screw extruder is a twin screw extruder.

26. The method of claim 15, further comprising the step of smoking said mixture after exiting said screw extruder.

27. The method of claim 15, wherein a die is located after said reaction zone which molds said mixture in a form conforming to the shape of said die.

28. The method of claim 26, wherein said die is a coextrusion die to form a multiple textured food product.

29. The method of claim 27, further comprising smoking said mixture after exiting said die.

30. The method of claim 29, further comprising freezing said mixture after said smoking step.

* * * * *